(12) United States Patent
Paschkewitz et al.

(10) Patent No.: US 10,173,365 B2
(45) Date of Patent: Jan. 8, 2019

(54) SPRAY CHARGING AND DISCHARGING SYSTEM FOR POLYMER SPRAY DEPOSITION DEVICE

(71) Applicant: PALO ALTO RESEARCH CENTER INCORPORATED, Palo Alto, CA (US)

(72) Inventors: John Steven Paschkewitz, San Carlos, CA (US); Eric Shrader, Belmont, CA (US); Victor Beck, Menlo Park, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 27 days.

(21) Appl. No.: 15/848,378

(22) Filed: Dec. 20, 2017

(65) Prior Publication Data
US 2018/0111312 A1    Apr. 26, 2018

Related U.S. Application Data

(62) Division of application No. 14/573,602, filed on Dec. 17, 2014, now Pat. No. 9,878,493.

(51) Int. Cl.
*B05B 5/00*    (2006.01)
*B29C 64/112*    (2017.01)
(Continued)

(52) U.S. Cl.
CPC ............ *B29C 64/112* (2017.08); *B05B 5/002* (2013.01); *B05B 17/04* (2013.01); *B41J 2/04526* (2013.01);
(Continued)

(58) Field of Classification Search
CPC ............ B29C 67/0059; B29C 67/0088; B29C 64/112; B05B 5/002; B05B 17/04;
(Continued)

(56) References Cited

U.S. PATENT DOCUMENTS 2,291,046 A    7/1942 Lange
3,554,815 A    1/1971 Otto
(Continued)

FOREIGN PATENT DOCUMENTS

EP    2227834    8/2011

OTHER PUBLICATIONS

Chapter 15, "Ink Jet Printing", 14 pages, found at http://www.lintech.org/comp-per/15INK.pdf.
(Continued)

*Primary Examiner* — Darren W Gorman
*Assistant Examiner* — Juan C Barrera
(74) *Attorney, Agent, or Firm* — Miller Nash Graham and Dunn

(57) ABSTRACT

The disclosed spray deposition systems and methods use spray charging and discharging techniques to assist with digital deposition of spray droplets on a substrate. For example, the disclosed systems and methods have a charging system that generates spray droplets from a spray generator and charges the droplets. Focusing electrodes help to collimate the droplets into a tight droplet stream and, optionally, steering electrodes help direct the tight droplet stream. A charge removal system neutralizes or removes the charge from the droplets, either during the deposition of the droplets on a substrate or after the droplets have been deposited on a substrate.

6 Claims, 13 Drawing Sheets

(51) Int. Cl.
| | |
|---|---|
| B05B 17/04 | (2006.01) |
| B41J 2/045 | (2006.01) |
| B33Y 30/00 | (2015.01) |
| B33Y 50/02 | (2015.01) |
| B05B 5/04 | (2006.01) |
| B05D 1/04 | (2006.01) |

(52) U.S. Cl.
CPC ............ *B41J 2/04586* (2013.01); *B05B 5/04* (2013.01); *B05D 1/04* (2013.01); *B33Y 30/00* (2014.12); *B33Y 50/02* (2014.12)

(58) Field of Classification Search
CPC ......... B05B 5/04; B05B 5/0536; B33Y 30/00; B33Y 50/02; B41J 2002/062; B41J 2/09; B41J 2/085; B41J 2/04526; B41J 2/04586; B41J 2002/031; B41J 2/08; B41J 2/095; B41J 2/10; B41J 2/41; B41J 2/415; B05D 1/04
USPC .......... 239/708, 704; 347/73, 74, 75, 76, 77, 347/82, 79, 83; 118/621, 623, 638, 620, 118/624–629; 427/458, 460, 466, 472, 427/483
See application file for complete search history.

(56) References Cited

U.S. PATENT DOCUMENTS

| | | | |
|---|---|---|---|
| 3,626,833 | A | 12/1971 | Koch |
| 3,649,829 | A | 3/1972 | Randolph |
| 3,702,258 | A | 11/1972 | Gibbons et al. |
| 3,717,875 | A | 2/1973 | Arciprete et al. |
| 3,873,025 | A | 3/1975 | Qvarnstrom |
| 3,926,114 | A | 12/1975 | Matuschke |
| 4,034,670 | A | 7/1977 | Zavodny |
| 4,222,059 | A | 9/1980 | Crean et al. |
| 4,384,296 | A | 5/1983 | Torpey |
| 5,270,086 | A | 12/1993 | Hamlin |
| 5,314,119 | A | 5/1994 | Watt |
| 5,835,114 | A | 11/1998 | Nagata et al. |
| 6,149,072 | A * | 11/2000 | Tseng ............... B22F 3/008 239/87 |
| 6,382,524 | B1 | 5/2002 | James |
| 6,576,861 | B2 | 6/2003 | Sampath et al. |
| 6,622,335 | B1 | 9/2003 | Anderson et al. |
| 6,934,142 | B2 | 8/2005 | Grosse et al. |
| 7,083,830 | B2 | 8/2006 | Minko |
| 7,837,307 | B2 * | 11/2010 | Schmitt ............... B41J 2/095 347/5 |
| 8,132,744 | B2 | 3/2012 | King et al. |
| 8,272,579 | B2 | 9/2012 | King et al. |
| 8,511,251 | B2 | 8/2013 | Sato |
| 8,552,299 | B2 | 10/2013 | Rogers et al. |
| 8,720,370 | B2 | 5/2014 | Rebstock |
| 8,742,246 | B2 | 6/2014 | Toyoda et al. |
| 9,021,948 | B2 | 5/2015 | Pattekar |
| 2002/0053320 | A1 | 5/2002 | Duthaler et al. |
| 2003/0222950 | A1 | 12/2003 | Jeanmaire |
| 2005/0000231 | A1 | 1/2005 | Lee |
| 2006/0035033 | A1 | 2/2006 | Tanahashi et al. |
| 2006/0071978 | A1 | 4/2006 | Steiner et al. |
| 2006/0119669 | A1 * | 6/2006 | Sharma ............... B41J 2/03 347/82 |
| 2009/0014046 | A1 | 1/2009 | Yu et al. |
| 2009/0153627 | A1 | 6/2009 | Barbet |
| 2010/0154856 | A1 | 6/2010 | Yuichi et al. |
| 2011/0017431 | A1 | 1/2011 | Yang et al. |
| 2011/0150036 | A1 | 6/2011 | Lee et al. |
| 2011/0154558 | A1 | 6/2011 | Peter et al. |
| 2012/0227778 | A1 | 9/2012 | Leonov |
| 2013/0070031 | A1 | 3/2013 | Nelson et al. |
| 2013/0087180 | A1 | 4/2013 | Stark et al. |
| 2014/0015901 | A1 * | 1/2014 | Marcus ............... B41J 2/04 347/54 |
| 2014/0146116 | A1 | 5/2014 | Paschkewitz |
| 2016/0175856 | A1 | 6/2016 | Paschkewitz |

OTHER PUBLICATIONS

Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.
Shi, X.D., "A Cascade of Structure in a Drop Falling from a Faucet," Jul. 8, 2004, vol. 265:219-222, Science, 4 pages.
Marple, A. and Liu, Y.H.: "Characteristics of Laminar Jet Impactors", Environmental Science & Technology, vol. 8, No. 7, Jul. 1974, pp. 648-654.
Bailey, Adrian G.: "The Science and technology of electrostatic powder spraying, transport and coating", Journal of Electrostatics, vol. 45, 1998, pp. 85-120.
Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, found at: http://www.ppsc-journal.com.
Kelly, Ryan T, et al.: "The ion funnel: theory, implementations, and applications", Mass Spectrometry Reviews, vol. 29, 2010, pp. 294-312.
Crowe, Clayton et al.: "Multiphase Flows With Droplets and Particles", CRC Press, LLC, 1998.
McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
http://www.stacoolvest.com/, retrieved on Dec. 19, 2014.
http://www.steelevest.com/, retrieved on Dec. 19, 2014.
http://veskimo.com/, retrieved on Dec. 19, 2014.
http://glaciertek.com/, retrieved on Dec. 19, 2014.
Chen, A., "Dispenser-printed planar thick-film thermoelectric energy generators," J. Micromech. Microeng., 21(10), 2011.
Hewitt, A.B., "Multilayered Carbon Nanotube/Polymer Composite Based Thermoelectric Fabrics," Nano Letters, 12(3), pp. 1307-1310, 2012.
Arens, E., "Partial- and whole-body thermal sensation and comfort—Part I: Uniform environmental conditions," Journal of Thermal Biology, vol. 31, Issues 1-2, Jan. 2006, pp. 53-59.
Arens, E., "Partial- and whole-body thermal sensation and comfort-Part II: Non-uniform environmental conditions," Journal of Thermal Biology, vol. 31, Issues 1-2, Jan. 2006, pp. 60-66.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.

(56) References Cited

OTHER PUBLICATIONS

"Ortho-Planar Spring", BYI Mechanical Engineering Website, URL: http://compliantmechanisms.byu.edu/content/ortho-planar-spring, retrieved from the Internet on Dec. 23, 2014.
S.-J. Kim, J.-H. Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Sholin, V. et al.: "High Work Function Materials for Source/Drain Contacts in Printed Polymer Thin Transistors," Applied Physics Letters, vol. 92, 2008.
Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.
Non-Final Office Action for U.S. Appl. No. 14/066,435, dated Jan. 21, 2016, 29 pages.

* cited by examiner

SPRAY CHARGING AND DISCHARGING SYSTEM FOR POLYMER SPRAY DEPOSITION DEVICE

CROSS REFERENCE TO RELATED APPLICATION

This application is a divisional of and claims priority to U.S. patent application Ser. No. 14/573,602, filed Dec. 17, 2014, which is incorporated herein in its entirety.

TECHNICAL FIELD

The disclosed methods and systems relate to aerodynamic polymer spray deposition techniques and, more specifically, to using electrical fields and charged polymer droplets to assist in polymer spray deposition.

BACKGROUND

Many manufacturing and industrial applications benefit from fluid atomization to create a fine vapor mist or aerosol, such as ink print heads, three-dimensional (3D) part manufacturing, fuel/air mixing used in combustion applications, atomizing air-paint mixtures for spray painting, applying coatings to pharmaceuticals, applying adhesives to various objects and surfaces, and the like. Once a component solution is atomized it can be readily processed to coat virtually any shaped surface.

Regardless of the application, most spray deposition systems create droplets at a nozzle tip that have inherent directionality. The conventional spray systems use airblast, shear atomizers, upstream atomizers, and a variety of collimation methods (i.e., virtual impactors and sheath flow control) to focus and direct the spray into a nozzle and then to targeted deposition. Generally, in the context of a print head, for example, the aerodynamic, airflow velocities required to deposit droplets of a small size, in the order of 1 micron, is high, about 30-50 m/s for droplet throw distances on the order of a millimeter (mm).

One conventional spray deposition method uses lateral cross-flows in a shared manifold of multiple fluid ejectors. The lateral cross-flows likely generate flow instabilities and secondary flows at the cross-flow velocities required to successfully deposit the small droplets with high spatial precision for a 3D printing application. Alternatively, some other conventional spray deposition systems use multiple, dedicated feed lines to each ejector or jet and a specialized inlet design that requires dedicated, miniature aerosol jet arrays. However, such a dedicated, specialized system is complex and the manifold inlet design is vulnerable to clogging, especially with fluids having non-Newtonian properties like high-viscosity solutions commonly used in 3D part fabrication and polymer melts used in fused deposition modeling (FDM) systems. Many of the drawbacks of the current systems and methods are amplified in a system with multiple nozzles.

To help with directing and focusing droplets, some droplet deposition systems, such as spray or powder coating painting systems used to apply metallic paint to vehicles, use rotary atomizers coupled with external corona generators and electrically grounded parts to achieve an electrostatically-assisted spray process having a highly-efficient deposition of material and uniform coating. Similar corona charging systems are used with polymer powder coating devices. However, such systems suffer from charge build-up and require the parts to be grounded. The high surface voltage build-up leads to electrical breakdown across the coating and coating thicknesses must be limited to 10's to 100's of microns, depending on the system. Coating dielectric (plastic) parts remains difficult because of the lack of an available grounding path in the dielectric material. Electrostatic directing and focusing strategies are simply not suitable for and present too many challenges to be efficient for many applications, including 3D part fabrication and other printing applications.

Therefore, the spray deposition art would greatly benefit from systems and methods that can direct and focus spray droplets and facilitate aerodynamic spray deposition.

SUMMARY

A polymer spray deposition system has a charging system, focusing electrodes and a charge removal system to help focus and direct droplets during deposition of the droplets on a substrate. A spray director can also be used, either before or after the droplets are charged, to further tightly collimate the droplets. The droplets can be formed by a spray generator, for example, having a fluid source. In some examples, steering electrodes can help steer the droplets into the charge removal system. Optionally, deposition airflow can be used to further focus the neutralized droplet spray onto the target substrate.

In other embodiments, a method of depositing polymer spray on a substrate includes depositing a charge on fluid droplets. The fluid droplets can be generated by a spray generator. The charged fluid droplets are focused into a tight fluid droplet stream. The charged droplets in the tight fluid droplet stream are deposited, on-demand, onto a substrate. The charge on the deposited fluid droplets is neutralized.

DETAILED DESCRIPTION

The disclosed polymer spray deposition systems and methods use spray charging and discharging techniques to assist with digital deposition of polymer spray droplets on a substrate. The disclosed example systems and methods employ electrical fields in conjunction with charged polymer droplets to tightly collimate and assist deposition of polymer sprays without using high-velocity lateral air flows that are often required in conventional grounded, electrostatic spray deposition systems. Further, the disclosed systems and methods for polymer spray deposition use electrostatic assist to direct and focus the polymer spray droplets by using aerodynamic impact and field steering rather than the conventional use of grounded target surfaces in other electrostatic assist particle deposition techniques.

The disclosed example systems and methods work well in depositing low-velocity sprays. Specifically, the disclosed systems and methods are useful for depositing spray in additive manufacturing applications like 3D part fabrication and in other coating and plastics applications. For example, 3D printers often use high-density polymer melts to deposit layers of the molten melt onto a substrate according to a digital model. Conventional droplet deposition or coating methods are limited because they either require high-velocity lateral air flow and/or grounding to efficiently deposit the droplets without clogging the jets depositing the droplets. The new designs disclosed here can be applied to 3D printing systems and print heads, among other applications, to improve the efficiency and capabilities of 3D part manufacturing by providing an aerodynamic system that does not require grounding and by not requiring high-velocity air flow that disrupts the deposition stream and creates secondary flows at the nozzles of the jets.

I. The Charging and Discharging Polymer Spray Deposition Systems

The disclosed polymer spray deposition methods and systems have a droplets charger, such as a corona charging system that charges the fluid droplets. The fluid droplets can be generated by a spray generator. Some of the examples create fluid droplets from fluids with non-Newtonian properties and might benefit from a fluid atomizer that uses fluid stretching techniques to overcome strong extensional thickening characteristic of non-Newtonian fluids. The fluid stretching technique stretches fluid into filaments between two diverging surfaces, such as a pair of counter-rotating rollers or between surfaces of two diverging pistons. When the stretched fluid filament reaches a point of the liquid bridge becoming unstable, which is also the capillary breakup point for the fluid filament, the fluid filament breaks up into several droplets leaving some excess fluid behind on the diverging surface(s). The formed droplets then enter the charging/discharging portion of the polymer spray deposition system.

Figure 1:
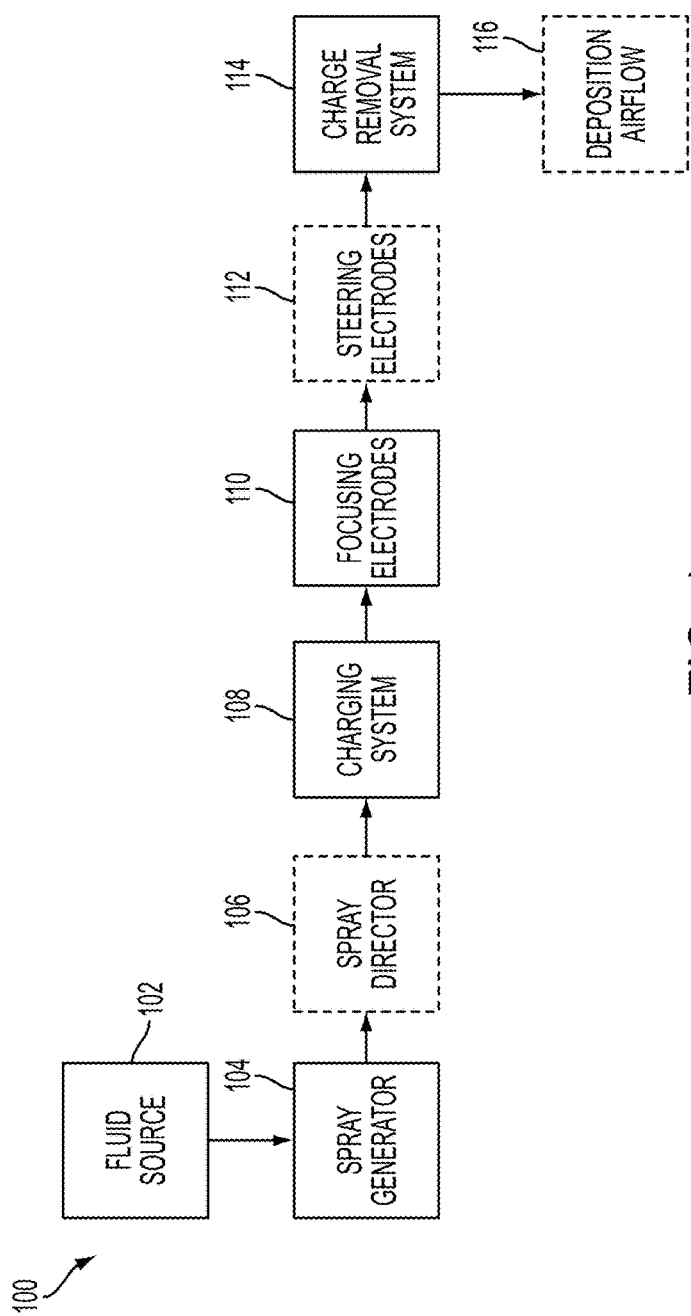
FIG. 1 is a block diagram of an example spray deposition system.
Figure 2:
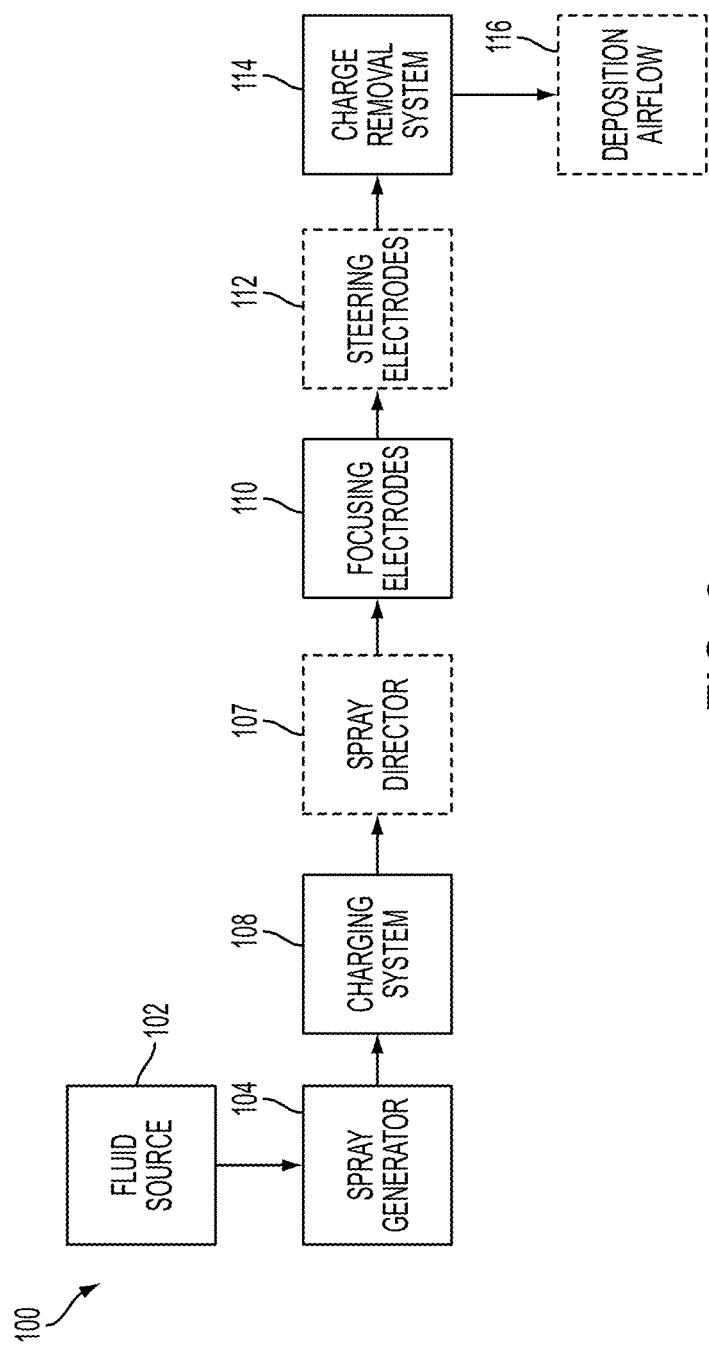
FIG. 2 is a block diagram of another example spray deposition system.

FIGS. 1 and 2 show block diagrams of example polymer spray deposition systems that use charging and discharging techniques. The arrows in FIGS. 1 and 2 show the general direction of movement of the droplets between block components of the system although is some alternative examples the droplets' flow pathway can be differently ordered. The arrows show the droplets' movement along their pathway, which ultimately results in deposition of the droplets onto a substrate (not shown).

The block diagrams shown in FIGS. 1 and 2 have a fluid source 102 that feeds a spray generator 104. The fluid source 102 is any suitable fluid source and feeds any desired fluid. In the example of the 3D printer, the fluid is a molten high-density polymer melt and the spray generator can be any pair or pairs of diverging surfaces that stretch fluid into fluid filaments that are stressed and eventually break into droplets of the fluid. However, any suitable fluid atomizer can be used to generate the droplets that are subsequently directed and deposited.

The block diagram of the polymer spray depositions systems shown in FIGS. 1 and 2 each have an optional spray director 106, 107, respectively. The spray director 106, 107 removes and directs the spray away from the spray generator. For example, the spray directors 106, 107 remove and direct the droplets spray away from the thin boundary layer of fluid that forms on diverging surfaces, such as the rollers' surfaces in an embodiment with two counter-rotating rollers. Additionally, some droplets are directed away from the place at which the fluid filament(s) break into droplets. In the example with the two, counter-rotating rollers, the fluid droplets are directed away from the downstream side of a nip defined between a pair of counter-rotating rollers.

In the example with the counter-rotating roller pair, two droplet spray streams generally form during the spray generating process—the first stream at the thin boundary layer and the second stream at the downstream side of the nip. Both of the streams can be captured for charging in the charging system or can be captured by a spray director and then charged. The spray director is optional, although it is helpful especially in embodiments with multiple streams of formed droplets, such as the pair of counter-rotating rollers and/or systems with multiple pairs of counter-rotating rollers. FIG. 1 shows the spray director 106 receiving the droplets generated by the spray generator 104 and FIG. 2 shows the spray director 107 receiving the droplets after they have been charged by the charging system 108.

The droplets are charged by a charging system 108, such as a corona charging system, either after or before the optional spray director 106, 107, as shown in FIGS. 1 and 2, respectively. The corona charging system 108 can be positive or negative and is used to deposit charge on the fluid droplets, such as the molten polymer melt droplets in the 3D parts fabrication example. The corona charging system 108 causes controlled, electrical discharge brought on by the ionization of fluid droplets surrounding an electrically-energized conductor. The ionization of the fluid droplets produce electrons that create either a positive or negative corona charge, both of which can be used to charge the droplets in the disclosed polymer spray deposition examples. The type of fluid being deposited can help determine whether the corona charging system is positive or negative because the fluid droplets of different materials have varying field charging behavior.

Referring again to FIGS. 1 and 2, the polymer spray deposition system 100 also has focusing electrodes 110 that collimate and direct the charged droplet stream. The focusing electrodes 110 use a combination of airflow and electrical fields to collimate and direct the charged droplets. For example, the focusing electrodes 110 can use a traveling wave of alternating current (AC) fields to tightly focus the beams of charged droplets to form a tight droplet stream in a similar way to the manner in which various types of ion traps, typically a radio frequency (RF) field, help to separate and isolate various particles and molecules in mass spectrometry. In the examples with multiple droplet streams, the multiple droplet streams are tightly collimated together into a single, tightly focused droplet stream. The droplet stream can be focused and collimated in any desired way using time- and/or spatially-variable electric fields.

FIGS. 1 and 2 show an example polymer spray deposition system 100 that optionally includes steering electrodes 112 in addition to or integrated with the focusing electrodes 110. In a print head, for example, the steering electrodes apply electric fields to steer the droplets forward and cause aerodynamic acceleration to encourage the sub-micron sized droplets to move along in the deposition system. The steering electrodes 112 accelerate the droplets towards some object or surface like a stage, sacrificial material, and/or a polymer and can be used in combination with deposition air flow techniques to selectively direct deposition of the droplets onto the target substrate.

The charged, collimated, and now accelerated droplets are then neutralized by a charge removal system 114, as shown in FIGS. 1 and 2. The charge is removed by using an oppositely-charged corona charging system, for example. The charge removal system 114 simply neutralizes the charge deposited on the droplets by the charging system 108. For example, the charging system 108 shown in FIGS. 1 and 2 can be a positive corona charge system and the charge removal system 114 can be a negative corona charge system that neutralizes the positive charge deposited by the positive corona charge system.

The polymer spray deposition system 100 shown in the block diagrams of FIGS. 1 and 2 also has deposition airflow 116 that helps guide the droplets towards the target substrate. The deposition airflow 116 can be applied before, after, or at the same time as the charge is removed from the droplets by the charge removal system 114. Also, the deposition airflow 116 can be applied to the droplets from any one or more desired direction(s).

Figure 3:
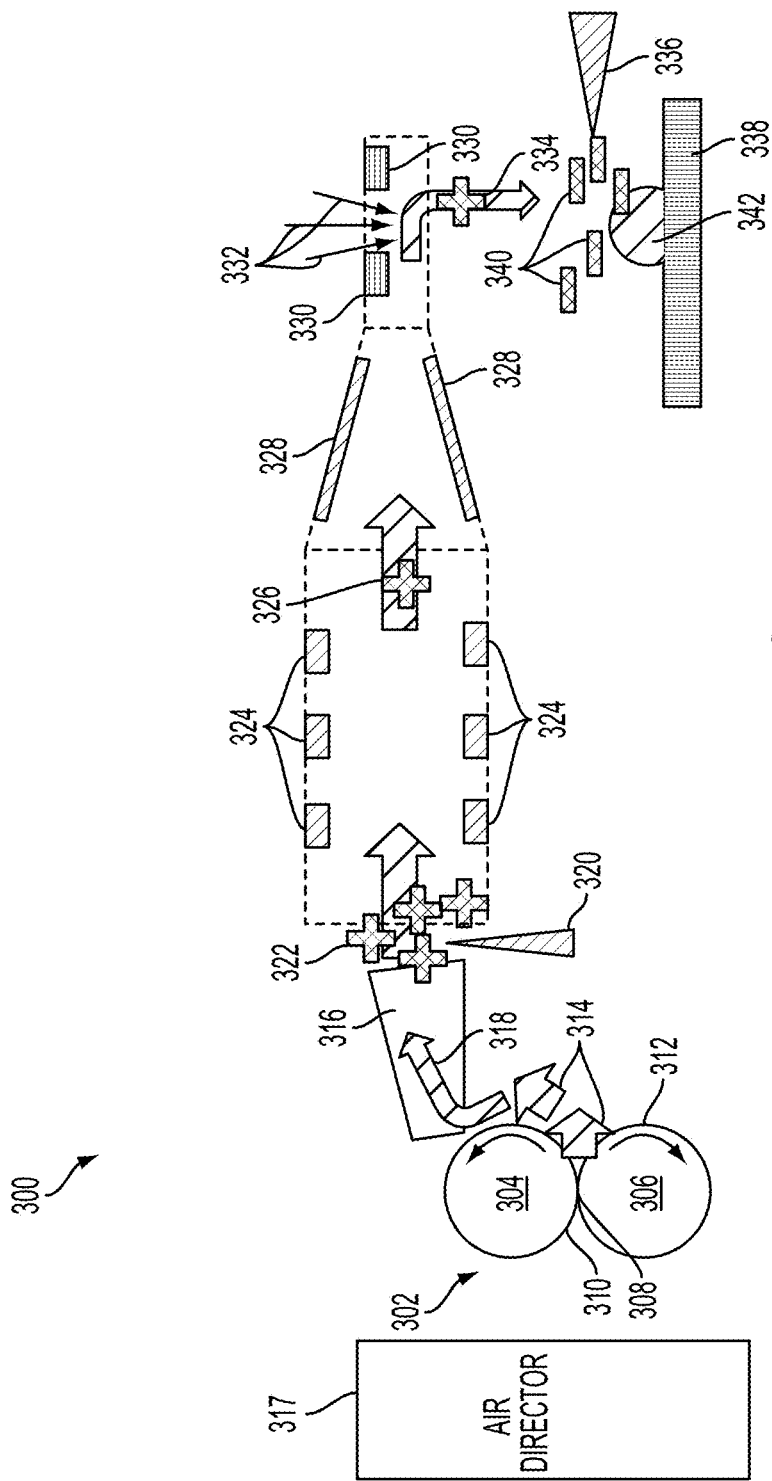
FIG. 3 is a schematic of an example spray deposition system.

FIG. 3 shows an example polymer spray deposition system 300. In this embodiment, the spray generator 302 is a fluid extension atomizer having two counter-rotating rollers 304, 306. The pair of counter-rotating rollers 304, 306 defines a nip 308 between them. The nip 308 can either be a space between the two rollers 304, 306 or the rollers 304, 306 are physically touching each other and the nip 308 is the point at which the rollers 304, 306 touch each other. The nip 308 defines an upstream side 310 and a downstream side 314. Fluid coating either or both rollers 304, 306 (not shown) is drawn through the nip 308 on the upstream side 310 by the rollers' counter-rotation and stretches into fluid filaments (also not shown) on the downstream side 312 of the nip 308.

The fluid filaments extend between the diverging surfaces of the rollers 304, 306. As the rollers 304, 306 counter rotate, the fluid filaments are stretched until they exceed their capillary break-up point and break into droplets on the downstream side of the nip 308. Some fluid retracts back onto the surface of the rollers 304, 306 so it can pool on the upstream side 310 of the nip 308 and can then be drawn in through the upstream side 310 of the nip 308 when the process repeats. The rollers 304, 306 are coated with the fluid in any suitable manner including pan coating, drip coating, slot bead coating, curtain coating, or any other fluid coating technique that coats one or both of the rollers with the fluid.

The arrows 314 show the direction of the droplet movement away from the downstream side 312 of the nip 308 and towards the spray director 316. The arrows 314 can represent multiple streams of the formed droplets, such as the stream formed on the thin boundary of the counter-rotating rollers 304, 306 and the stream formed by the breaking of the fluid filaments on the downstream side 312 of the nip 308 in a direction away from the nip 308. The arrows 314 can represent any number of streams of formed droplets and the number and type of streams vary depending on the type of fluid atomizer used to generate the droplets, the fluid being atomized, and other system variations.

The spray director 316 collects the each of the streams of droplets and directs the droplets away from the spray generator 302, as shown by the arrow 318 through the spray director 316. The spray director 316 is funnel-shaped in this example and also directs the droplets towards the charging system 320 to charge the droplets. The charging system 320 in FIG. 3 is a positive corona charging system 320 that applies a positive charge 322 to the droplets. The positively charged droplets, being like-charged, do not agglomerate because of the electrostatic repulsion that exists between the droplets.

The positively charged droplets then flow between three pairs of focusing electrodes 324 to form a tightly collimated and focused droplet stream 326. The two electrodes in each pair of electrodes 324 are spaced apart from each other across the flow pathway of the droplets 324. The pairs of spaced apart electrodes are positioned next to each other to form a tunnel-like pathway through which the positively charged droplets flow. Any suitable number of electrodes and electrode pairs can be used. The electrodes apply an electric field to the droplet stream. In some examples, the droplet stream flow shown by arrow 318 is helped by airflow from an air director 317 applied to the droplets to move the droplets along the flow pathway between the focusing electrodes. The airflow can help to move the droplets along, to steer the droplets in a particular direction to help in the collimation process, to adjust or maintain the velocity of the droplets, etc. The combination of the applied airflow and the compression forces of the applied electric fields causes the droplets to tightly pack together in the resulting collimated droplet stream.

The collimated droplet stream droplets 326 are still positively charged. The collimated droplet stream exits the focusing electrodes and flows through a pair of baffles 328. The baffles 328 are spaced apart from each other and taper in the direction of the droplet pathway. The tapering of the baffles 328 helps further focus the collimated droplet stream. After the charged, collimated droplet stream exits the baffles 328, deposition airflow 332 directs the droplet stream to turn about 90° in a clockwise direction towards the substrate 338 onto which the fluid droplets are to be deposited. The droplet stream travels by an opening between two walls 330. The deposition airflow 332 flows through the opening between the walls 330 and controls the direction of the fluid stream by changing its direction from generally horizontal to approximately vertical, which is an approximately 90° change in direction. The new, approximately vertical direction of the fluid stream 334 directs the fluid stream 334 towards the substrate 338 onto which the fluid droplets are deposited.

The polymer spray deposition system 300 shown in FIG. 3 has a charge remover 336 as well. The charge remover 336 in this example is a negative corona system that neutralizes the positively charged droplets by exposing them to negatively charged plasma 340. In this example, the positively-charged droplet stream is neutralized by the negative corona charge removal system before the droplets are deposited on the substrate 338 although in alternative examples the positive droplets could be neutralized after the droplets are deposited on the substrate as well. FIG. 3 shows the neutralized droplets 342 that are deposited on the substrate 338.

Figure 4:
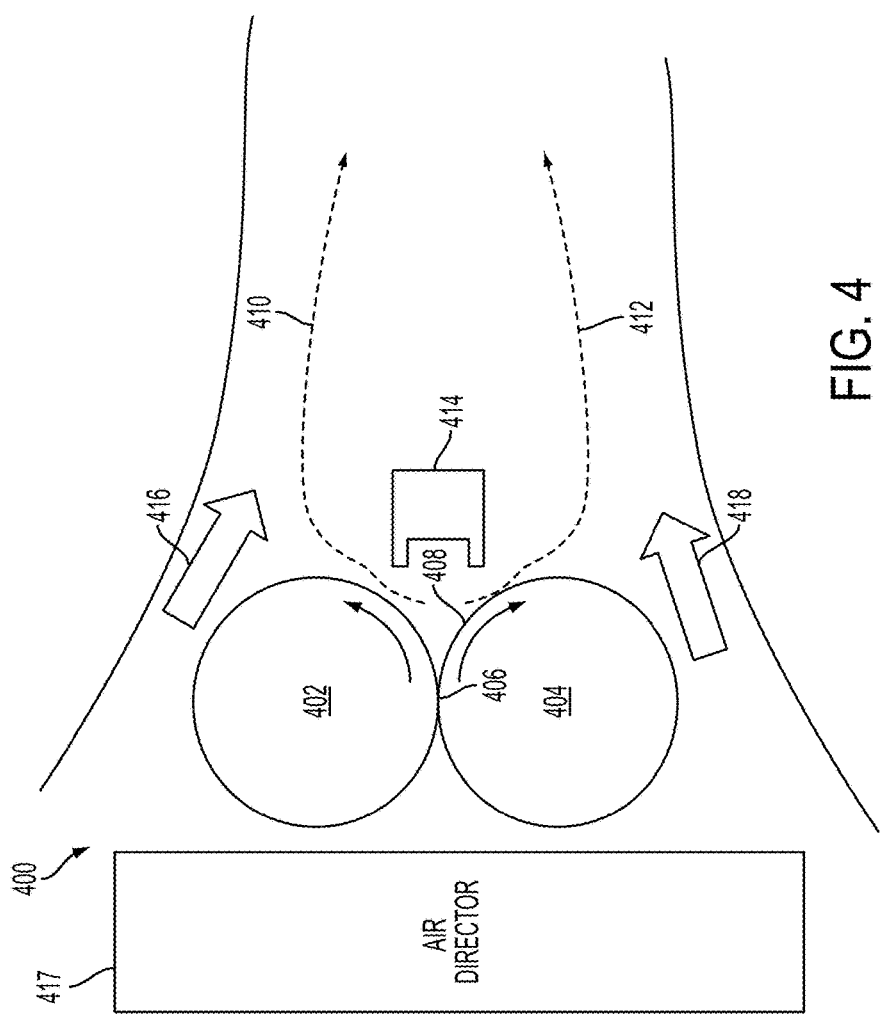
FIG. 4 is a schematic of another example spray deposition system.

FIG. 4 shows a section of another example polymer spray deposition system 400. This example system 400 also has a pair of counter-rotating rollers 402, 404 that generate the droplets. In the same manner as the rollers in the example system 300 shown in FIG. 3, the counter-rotating rollers 402, 404 define a nip 406 between them. Fluid is drawn through the nip 406 so that fluid filaments are stretched between the diverging surfaces of the counter-rotating rollers 402, 404 on the downstream side 408 of the nip 406 and break into the droplets. The droplets form two droplet streams 410, 412 that flow past a corona charger 414 on both sides of the charger 414. The corona charger 414 deposits charge on the fluid droplets before an air director 417 engages the charged droplet streams 410, 412 and directs the droplets streams along its flow pathway. The air director directs air through an air manifold by applying air streams 416, 418 to respective droplet streams 410, 412. The air manifold guides the droplet stream towards the focusing electrodes.

a. The Charging System

Figure 5:
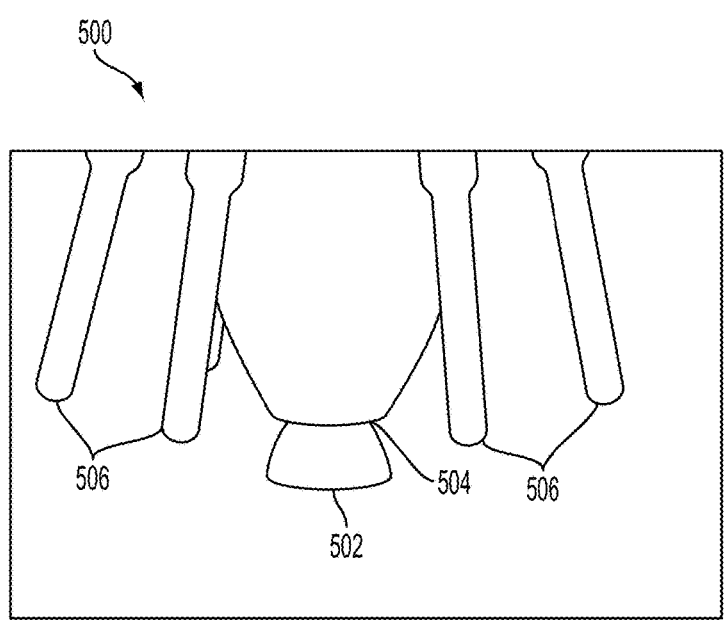
FIG. 5 is an example charging system for a polymer spray deposition system.

FIG. 5 shows an example droplet corona charging system 500 having a bell 502 and a coaxial shaping air ring 504 that are surrounded by several electrodes 506. The bell 502 and the coaxial air shaping ring 504 are used to atomize the fluid and shape the resulting spray plume such that corona charging of the droplets is more effective. The electrodes 506 externally deposit a charge on the droplets. The corona charging system 500 can operate at approximately 50-70 kilo volts (kV) with volumetric air flow rates of 100 liters per minute (LPM). The electric field charging behavior for the droplets is described by the Pauthenier equation shown below:

$$q = \left[1 + 2\left(\frac{\varepsilon_r - 1}{\varepsilon_r + 1}\right)\right] * 4\pi a^2 \varepsilon_0 E * \frac{t}{t + \tau}$$

In the Pauthenier equation, q is the charge acquired by a spherical dielectric particle having a relative radius, a, and relative permittivity, $\varepsilon_r$, when exposed to an ion flux in a field, E. The ion flux is implicit in the charging time constant q, which is given by:

$$\tau = \frac{4\epsilon_0 E}{J}$$

Where J is the current density of the ion flux.

The Pauthenier equation shows the relationship between charge acquired by a dielectric polymer droplet as a function of the corona parameters. If the droplets are exposed to field charging for a time, t, significantly longer than $\tau$, then charging is maximized.

Droplets that generally have residence times in the corona charge on the order of 0.001 seconds (s) are sufficient to reach the maximum charge level for the droplets, which is known as the Pauthenier limit, calculated by the equation shown below:

$$q_{max} = 12\pi a^2 \varepsilon_0 E$$

The resulting maximum charge is then known.

b. The Focusing Electrodes & the Steering Electrodes

Figure 6:
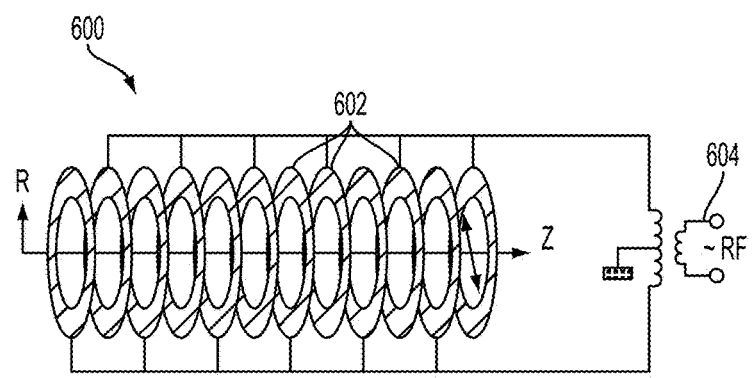
FIG. 6 shows a schematic of example focusing electrodes for a polymer spray deposition system.

FIG. 6 shows a diagram of an example stacked ring radio frequency (RF) ion guide, which is one type of the focusing electrodes discussed above. An alternative approach to realization of guiding electrodes with alternating current (AC) fields is in traveling wave electrophoresis systems employed in microfluidics for droplet and cell manipulation.

Figure 7:
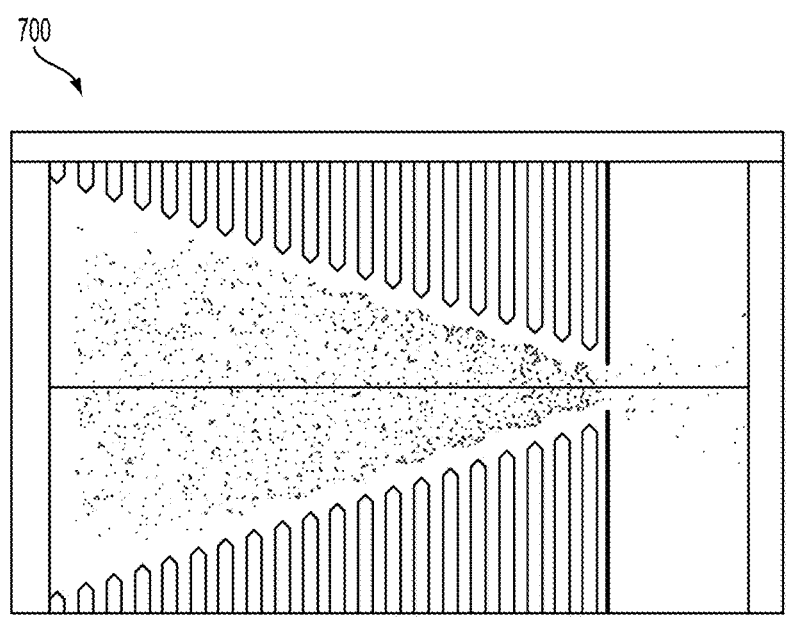
FIG. 7 is an example simulation of the transport of droplets for the focusing electrodes design shown in FIG. 6.
Figure 8:
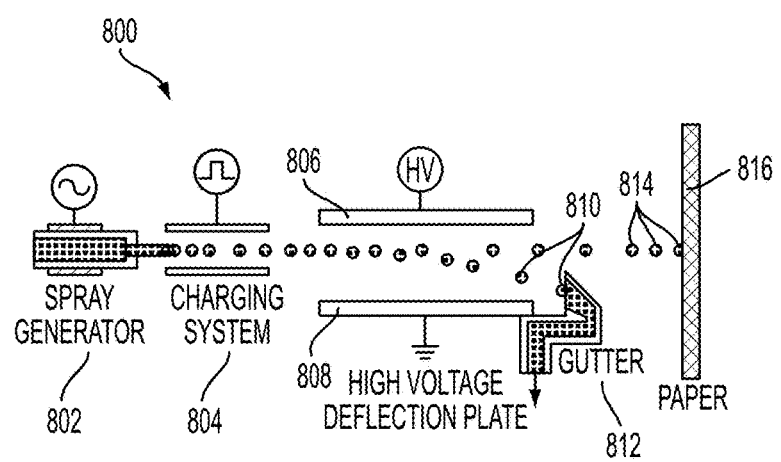
FIG. 8 shows an example polymer spray deposition system with steering electrodes.

The RF ion guides are ion funnels typically used in mass spectrometry instruments and are an exemplary realization of charged particle collimation using time- and space-varying electrical fields. The ion funnels use closely spaced electrodes 602 and RF potentials 604 that confine a dispersed cloud of ions and that focus the ions into a tight beam. FIG. 7 shows a computer model simulation of the droplets 700 as they are collimated by the ion funnel shown in FIG. 6.

In the ion funnel, alternating potential fields help to collimate the droplets together by applying a net potential across the flight tube, the length of the stacked rings of electrodes 602 shown in FIG. 6, which causes transport from the injector to the detector, and by applying high radio frequency (RF) alternating potentials. The resulting, effective potential field confines charged particles to a narrow beam. The stacked ring electrode 602 arrangement creates an effective potential distribution that is nearly field-free in the beam region but has a sharp potential gradient in the vicinity of the electrode ring. Other ways to alternate potentials field to help collimate the droplets together can be used in substitution of or in addition to the ion funnel example.

Optionally, steering electrodes help to steer the droplets onto the substrate. Electrical fields can be used to induce droplet motion away from the main droplet direction flow and towards the substrate. The electrical fields can vary to allow some droplets through, but not others, which helps control the volume of droplets deposited on the substrate. For example, electrical steering techniques are used in inkjet print heads to dump the spray into a recycle trap until droplets from the jet need to be deposited on the substrate. The steering electrodes are turned off or the electric field is reduced when a jet of droplets is desired, which is known as "off-mode" steering of inkjet streams.

FIG. 8 shows an example spray deposition system with steering electrodes 800. The system 800 has a droplet generator 802 and a charging system 804 that can be any of the disclosed examples discussed herein. The system 800 also includes a pair of high voltage steering electrodes 806, 808 between which the charged droplets travel after they are charged by the charging system 804. The voltage applied to the droplets creates a Coulomb force on the droplets, $F_C=qE$ deflects the droplet stream between the steering electrodes 806, 808. The applied voltage applies a force on the droplets that causes some (or all) droplets to change direction towards a recycle trap, such as the droplets 810 that are directed towards the gutter 812 shown in FIG. 8. Other droplets 814 can still maintain their trajectory and are deposited on the substrate 816, which is paper in the example shown in FIG. 8.

The steering electrodes can direct any portion, including all, of the droplets towards the recycle trap and can operate in a range of applied voltages. The range of applied voltages can vary the electric field being applied to the droplets, which in turn varies the volume and direction of those droplets that are redirected from the droplet pathway towards the recycle trap. For example, in an inkjet print head the steering electrodes can be turned on for a particular jet until that jet is supposed to deposit droplets onto the paper or other substrate. When turned off, the jet deposits droplets onto the substrate. The captured droplets in the recycle trap can be recycled back into the fluid source that feeds the spray generator, in some examples, or can be discarded or recycled to a different portion of the system in other examples.

Some example spray deposition systems have either the focusing electrodes or the steering electrodes. Other alternative systems have both the focusing electrodes and the steering electrodes. Still in other systems, the focusing electrodes and the steering electrodes can be integrated into a single focusing/steering element that both focus the droplets into a tightly collimated stream and steer the formed droplets in a desired direction.

c. The Charge Removal System

Figure 9:
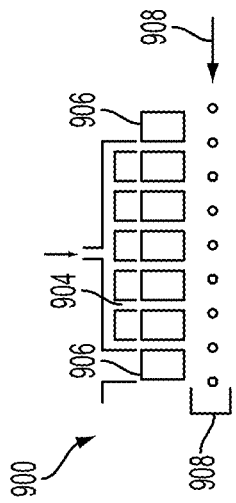
FIG. 9 is an example charge removal system for a polymer spray deposition system.
Figure 10:
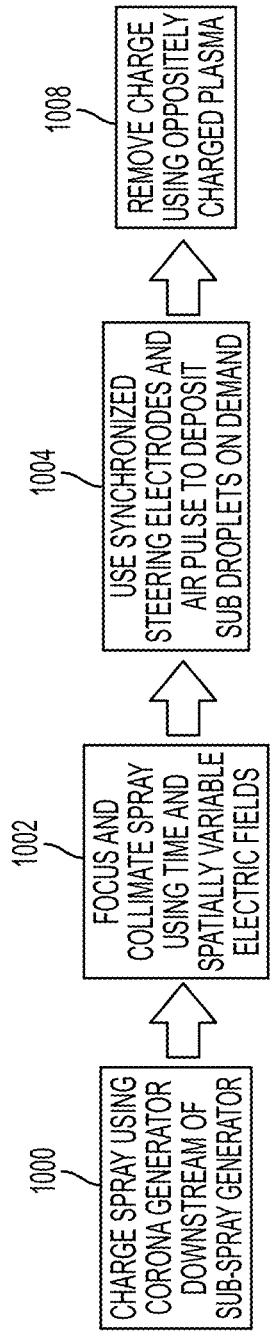
FIG. 10 is a method flowchart for a polymer spray charge and discharge method for polymer spray deposition.

A charge removal system removes the charge from the droplets either during the droplet deposition process or after the droplets are deposited on a substrate. For example, after aerodynamic deposition, the charge removal system neutralizes the charge of the droplets. For example, FIG. 9 shows a charge removal system 900 commonly used in removing electrostatic build-up on plastic web processing. Such a charge removal system 900 also can be used in the spray deposition systems disclosed here.

The charge removal system 900 shown in FIG. 9 is a neutralizing plasma charge removal system that removes charge from the charged droplets 902. The charge removal system 900, or charge neutralizer, has alternating electrodes 904 and dielectric elements 906 that create a plasma region within a defined proximity from the alternating electrodes 904 and dielectric elements 906. When the droplets travel through a plasma region 908 of the charge removal system 900 where the charge can be deposited on the droplets, the oppositely charged plasma neutralizes the charged droplets. As discussed above, the droplets can be neutralized either while they are being deposited on the substrate or after the droplets are deposited on the substrate. In FIG. 9, the charge removal system 900 is shown positioned vertically above the droplets being neutralized, but may be positioned differently with respect to the droplets in alternative examples.

II. The Charging and Discharging Polymer Spray Deposition Methods

Methods of charging and discharging polymer spray deposition are also disclosed. The spray deposition methods include depositing a corona charge on fluid droplets generated by a spray generator and then focusing the charged fluid droplets into a tight fluid droplet stream. The tight fluid droplet stream is deposited, on-demand, onto a substrate. The charged droplets are neutralized either while they are being deposited on the substrate or after they are deposited on the substrate.

The corona charge is deposited using any of the above disclosed methods or other known methods to charge droplets. The droplets are charged downstream of the spray generator 1000, as discussed above and as shown in FIG. 10. The charged droplets are then focused and collimated by using time and spatially variable electric fields 1002, such as some of the examples discussed above that use focusing electrodes to focus and collimate the droplets into a tight fluid droplet stream.

The tight fluid droplet stream is deposited onto a substrate. In some examples, the deposition of the droplets happens on demand, either with a manually controlled or an automatically controlled system. For example, synchronized steering electrodes, such as the steering electrodes discussed above, and air pulses are used to deposit material on-demand. The combination of the steering electrodes and the air pulse can be used to achieve droplet deposition of a specific volume and density at a specific flow rate on a specific location.

For example, a 3D printer has digital data depicting a particular part to be printed. A controller controls individual jets of the 3D printer according to the digital data for the part, layer by layer. When a particular jet needs to deposit droplets, the 3D printer sends that jet a signal to trigger the jet to deposit droplets, which can sometimes be an instruction to deposit a specific volume, density, and/or flow rate of the droplets. Multiple jets deposit droplets in unison. Any suitable on-demand system can be used.

Either during deposition of the droplets or after the droplets are deposited, the charge on the droplets is removed by a charge removal system. For example, the charge removal system can be an oppositely charged plasma system that is charged opposite of the charge deposited on the droplets by the charging system. In the example shown in FIG. 10, the charge is removed by using oppositely charged plasma after the droplets have been deposited on the substrate.

III. Examples of Molten Polymer Melt Systems & Methods

In an example, a dielectric, molten polymer melt, such as those used in 3D printers, is atomized by a spray generator, such as the spray generator examples discussed above having two counter-rotating rollers that stretch fluid filaments that break into droplets of the molten polymer melt. For the 3D printers, a molten polymer melt droplet is can be 1 μm in diameter. The molten polymer melt droplets are charged using the corona charging systems discussed above to achieve a charge of about $-1e^{-12}$C, calculated by the Pauthenier equation discussed above in regards to FIG. 5.

Because of the 1 μm diameter and a charge of about $-1e^{-12}$C on each droplet, each droplet's trajectory is a function of the Coulombic force on the droplet, as calculated by the following equation:

$$F_C = qE$$

The Colombic force, $F_C$, variables include q, which is the electric charge on the droplet (C), and E, which is the electric field (V/m).

The drag force on each droplet is:

$$F_D = \tfrac{1}{2}\rho_C C_D A|u-v|(u-v)$$

The drag force variables include $\rho_C$, which is the density of the conveying phase (air); $C_D$, which is a drag coefficient; A, which is the area of the droplet; and (u−v), which is the slip velocity or the distance between drop and carrier phase velocity.

In this example, the dielectric polymer melt droplets have persistent surface charge deposited by the upstream corona charger. Using electric fields, the charged droplets are steered and collimated prior to aerodynamic deposition on a substrate. To achieve droplet steering, the electrical forces must be comparable to or greater than the aerodynamic drag force. In aerodynamic deposition, the drag force is on the order of $1\times10^{-9}$ to $1\times10^{-12}$ Newtons (N), depending on the velocity of the droplets. To generate a Coulomb force of comparable magnitude requires an electric field strength of around $1\times10^{3}$–$1\times10^{4}$ volts/meter (V/m). This magnitude of electric field strength can be achieved in small gaps without high voltage fields and is less than the breakdown strength of air. Air's breakdown strength is about 1000 times higher, around $3\times10^{6}$ V/m. For example, a lateral electrical field of 5000 V/m is applied to the 1 μm droplets using a 4V potential to steer and collimate them into a tight droplet stream.

A specific example molten polymer melt print head system schematic 1100 is shown in FIG. 11, which illustrates the ability of the electric fields to both collimate and steer the droplet stream. Two sets of electrodes, the collimating electrodes and the steering electrodes, help to collimate the droplets into a tight cylinder shape and steer the tightly collimated cylinder of droplets into the center of the print head jet and onto the target substrate, respectively. The collimating electrodes are a series of three pairs of electrodes having progressively higher electric fields from the inlet 1101 of the jet towards the outlet. In the example shown in FIG. 11, the first pair 1102 of collimating electrodes has an electric potential of about 0.5V, the second pair 1104 has a potential of about 1V, and the third pair 1106 has an electric potential of about 1.5V. Each pair of collimating electrodes 1102, 1104, 1106 is spaced apart from its mate across the jet's droplet flow pathway 1108.

Figure 11:
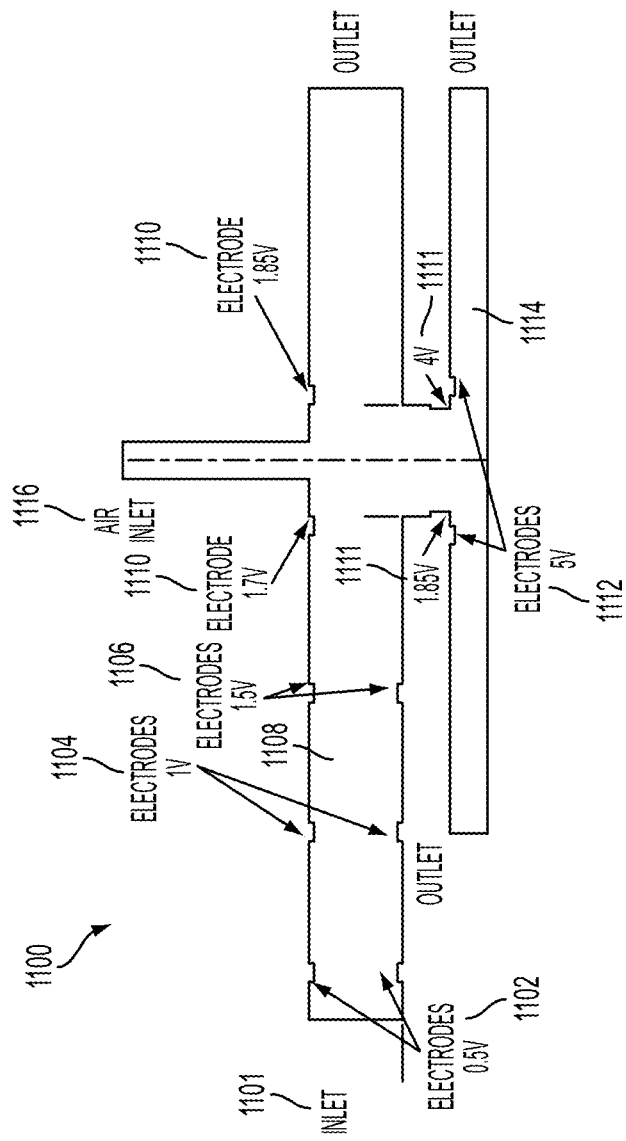
FIG. 11 is a schematic of an example print head that has an electrical collimation and a combined aerodynamic and electrical deposition system.

The steering electrodes include two pairs of electrodes 1110, 1112, as shown in FIG. 11. The first pair 1110 applies an asymmetric electric field to the droplet stream, which causes the droplet stream to turn, in this example a 90° turn clockwise, towards another pair of steering electrodes 1112 and an outlet 1114. The second pair of steering electrodes 1112 helps guide the droplets onto the surface. The system 1100 in FIG. 11 also has an air deposition flow inlet 1116 that selectively applies air to the droplet stream and another pair of steering electrodes 1111 to even further refine the steering and deposition process and aid the steering electrodes in directing the droplets.

Figure 12:
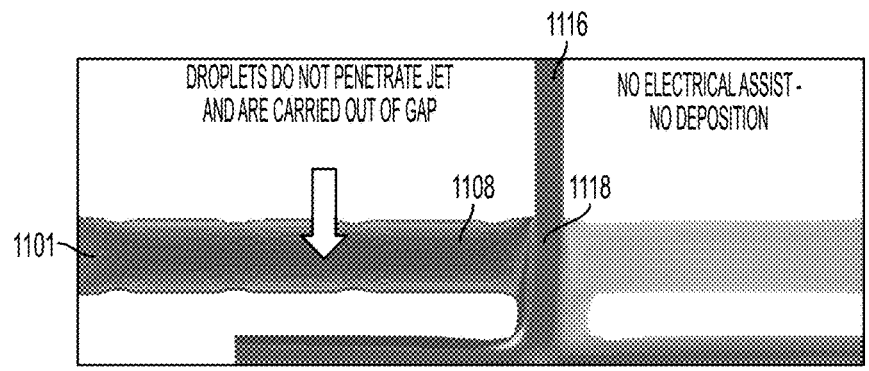
FIG. 12 shows an example droplet pathway for a polymer spray deposition system with no electrical assist and no deposition techniques employed.
Figure 13:
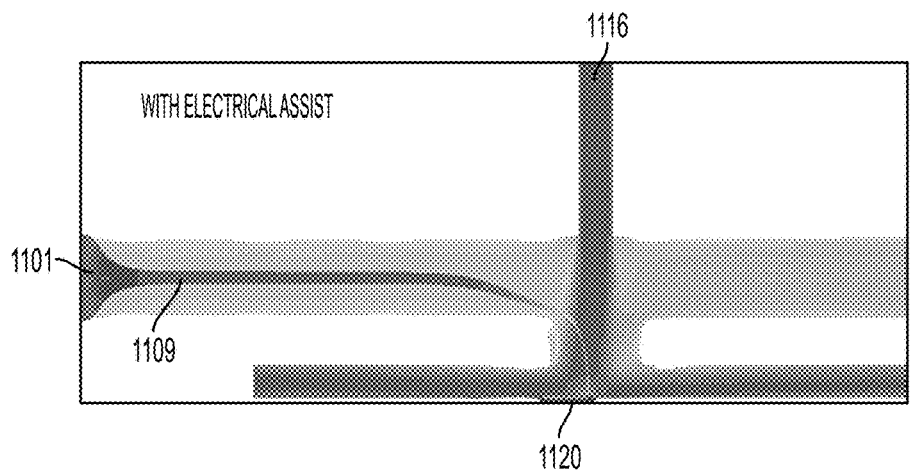
FIG. 13 is an example droplet pathway for a polymer spray deposition system with electrical assist.

FIGS. 12 and 13 show examples of droplet streams and their respective flow pathways in the print head shown in FIG. 11. FIG. 12 shows the sample print head structure shown in FIG. 11 with an inlet 1101, a droplet flow pathway 1108, and an air deposition flow inlet 1116 that selectively applies air to the droplet stream. In this example, the air deposition flow inlet 1116 applies air to the droplet stream. FIG. 12 shows a system without focusing or steering electrodes or other electrical assist. The droplet pathway 1108 never collimates into an aligned, tight droplet stream. When the air deposition flow inlet 1116 applies air 1118 to the droplet pathway 1108, the droplets are swept into the gap by the higher speed crossflow of the applied air 1118 and are not deposited on the substrate.

FIG. 13 again shows the sample print head structure shown in FIG. 11 with the inlet 1101, the droplet flow pathway 1108, and the air deposition flow inlet 1116. A set of collimating electrodes (not shown), similar to the collimating electrodes 1102, 1104, 1106 of FIG. 11, cause the droplets to collimate into a tight droplet stream 1109, as shown in FIG. 13. Steering electrodes (not shown) placed near the air deposition flow inlet 1116 cause the tight droplet stream 1108 to gradually turn into a jet nozzle until the droplets are steered into the center of the jet and impact the substrate 1120.

Figure 14:
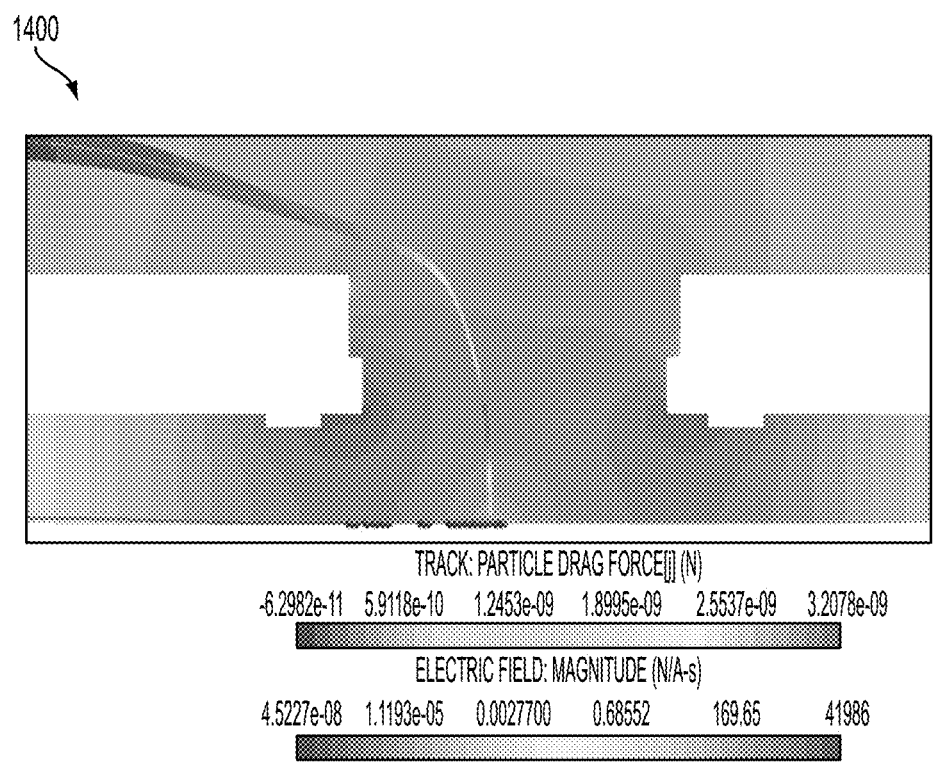
FIGS. 14 and 15 show a comparison of particle drag and Coulomb forces, respectively, for a polymer spray deposition system having both electrical collimation and assisted deposition.
Figure 15:
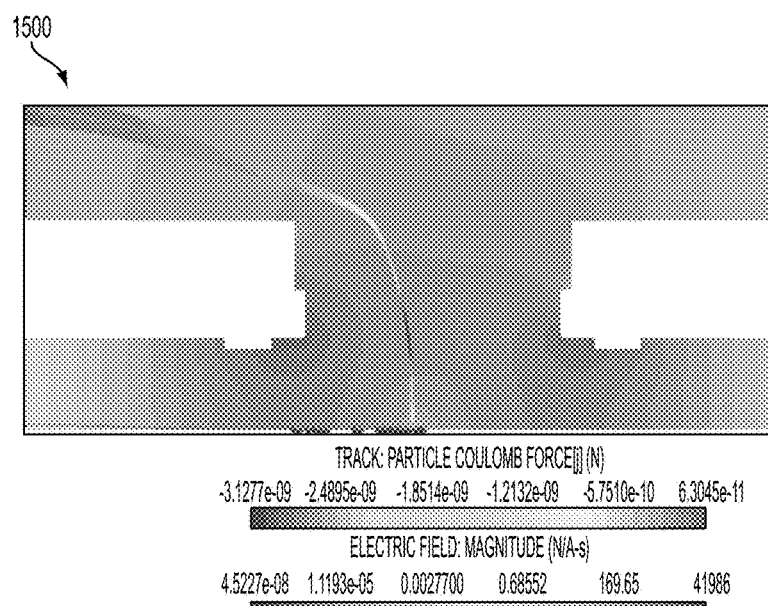

FIGS. 14 and 15 show a comparison of the particle drag force 1400 and the Coulomb forces 1500 on the droplets that provide focusing and steering of the droplets towards the center of the jet nozzle and ultimately to the target substrate. The magnitudes of the drag and the Coulomb forces on the droplets are comparable, with the Coulomb force providing steering and collimation and the aerodynamic flow enabling deposition. In the 3D printing example, electrical steering and aerodynamic deposition is used because grounding is not possible or practical when the printed part is built up layer by layer. As with the other spray deposition systems discussed above, after or alternatively during deposition of the droplets, the charge is removed using any of the disclosed charge removal systems.

Figure 16:
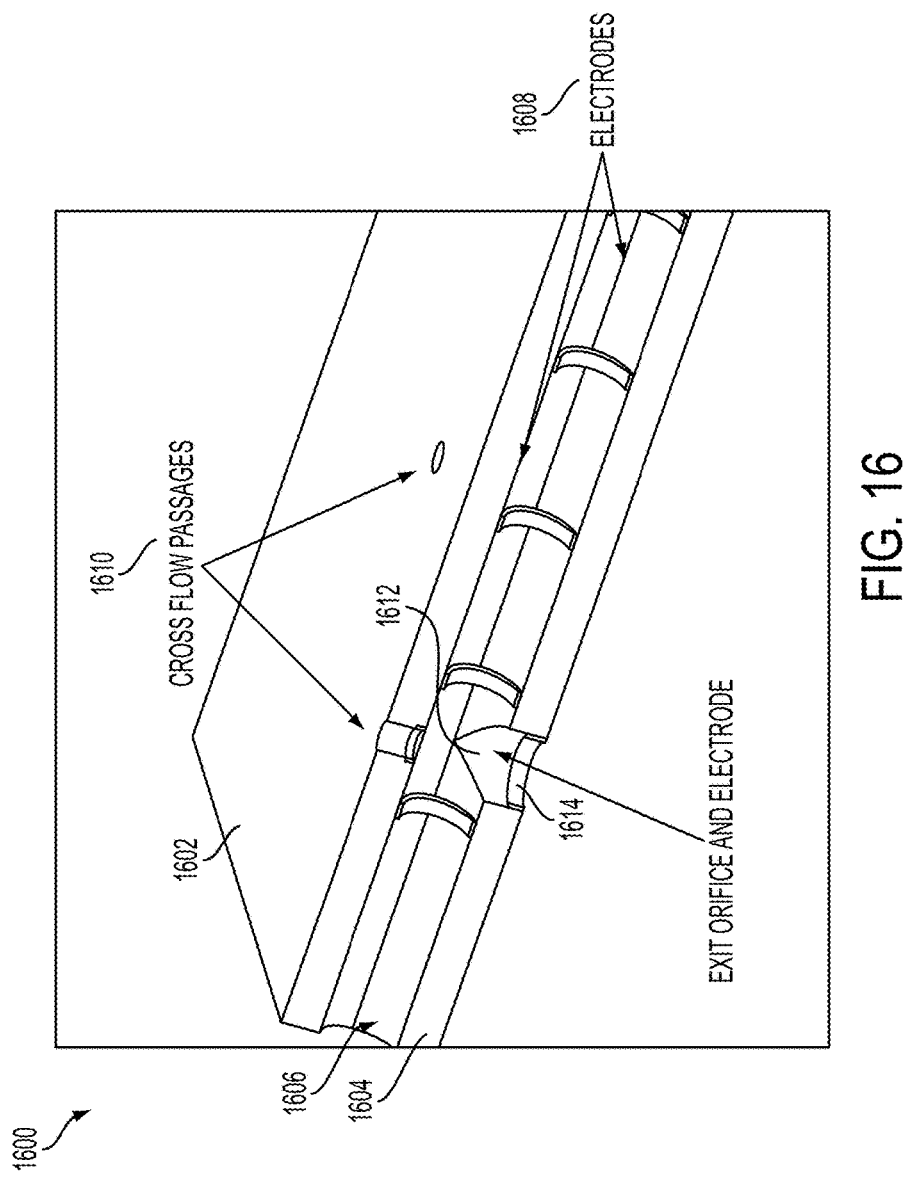
FIG. 16 is a portion of an example print head manifold having both electrical collimation and assisted deposition.

FIG. 16 shows a cross-sectional view of a three-dimensional perspective view 1600 of the example print head shown in FIG. 11. In this example, the manifold is two layers 1602, 1604 of dielectric plastic material that tolerates high heat, such as polyether ether ketone (PEEK) or polychlorotrifluoroethene (PCTFE). The droplet flow pathway 1606 has a series of electrode rings 1608 that serve as the collimating and the steering electrodes to form the tight droplet stream. Multiple cross-flow passages 1610 extend through the top manifold layer 1602 into the droplet flow pathway 1606. Using such cross-drilled passages facilitates gas and droplet transport. The collimating and steering electrodes may be coaxially-mounted washers, in an example. The electrodes positioned on either side of the exit orifice may be asymmetric, as discussed above. Electrical connections can be provided, in some examples, by adding drilled passage or via through a manifold layer.

An exit orifice 1612 extends through the bottom manifold layer 1604 through which the droplets exit the jet to be deposited onto the substrate (not shown). An exit orifice electrode 1614 is positioned within and is integral with the exit orifice 1612. The example print head shown in FIG. 16 can be one of a multiple print head jet array within a single print head. Further, a print head jet may have multiple exit orifices that deposit droplets onto the substrate.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of depositing spray on a substrate, comprising:
   depositing a corona charge on fluid droplets generated by a spray generator;
   focusing the charged fluid droplets into a collimated fluid droplet stream using pairs of electrodes spaced apart across a flow pathway to performing the collimated stream;
   depositing, on-demand, the charged fluid droplets onto a substrate; and
   neutralizing the corona charge of the deposited fluid droplets.

2. The method of claim 1, wherein the focusing the charged fluid droplets includes focusing the charged fluid droplets in time-variable and spatially-variable electric fields.

3. The method of claim 1, wherein the neutralizing the corona charge of the deposited fluid droplets includes neutralizing the corona charge with an oppositely charged plasma.

4. The method of claim 1, wherein the depositing a corona charge on the fluid droplets includes depositing the corona charge of a selected polarity on the fluid droplets.

5. The method of claim 1, wherein the depositing, on-demand, the charged fluid droplets include using synchronized steering electrodes and an air pulse to deposit the fluid droplets onto the substrate.

6. The method of claim 1, wherein the corona charge deposited on the fluid droplets is a positive corona charge and the neutralizing the corona charge of the deposited fluid droplets includes applying a negative corona charge to the deposited fluid droplets.

* * * * *